(12) United States Patent
Lue

(10) Patent No.: US 10,077,128 B2
(45) Date of Patent: Sep. 18, 2018

(54) COMPACT, LOW COST SHRINK LABELER

(71) Applicant: NuBiome, Inc., Mountain View, CA (US)

(72) Inventor: Brian C. Lue, Mountain View, CA (US)

(73) Assignee: NuBiome, Inc., Mountain View, CA (US)

( * ) Notice: Subject to any disclaimer, the term of this patent is extended or adjusted under 35 U.S.C. 154(b) by 0 days.

(21) Appl. No.: 15/430,366

(22) Filed: Feb. 10, 2017

(65) Prior Publication Data

US 2017/0225818 A1 Aug. 10, 2017

Related U.S. Application Data

(60) Provisional application No. 62/293,752, filed on Feb. 10, 2016.

(51) Int. Cl.
| | |
|---|---|
| *B29C 61/02* | (2006.01) |
| *B65C 9/28* | (2006.01) |
| *B29C 63/42* | (2006.01) |
| *B29C 61/00* | (2006.01) |
| *B29C 63/00* | (2006.01) |
| *B29C 63/38* | (2006.01) |

(52) U.S. Cl.
CPC .............. *B65C 9/28* (2013.01); *B29C 61/00* (2013.01); *B29C 61/02* (2013.01); *B29C 63/0069* (2013.01); *B29C 63/38* (2013.01); *B29C 63/42* (2013.01)

(58) Field of Classification Search
CPC ..... B29C 61/00; B29C 61/02; B29C 63/0069; B29C 63/38; B29C 63/42; B65B 53/00; B65B 53/02; B65B 53/04; B65B 53/06

USPC ................ 156/84, 85, 86, 497, 499, 556
See application file for complete search history.

(56) References Cited

U.S. PATENT DOCUMENTS

| | | | | |
|---|---|---|---|---|
| 3,349,502 | A * | 10/1967 | Kiefer | B65B 53/063 34/216 |
| 3,678,244 | A * | 7/1972 | Worline | B65B 53/063 219/388 |
| 3,744,146 | A * | 7/1973 | Nichols | B65B 53/063 34/212 |
| 4,199,851 | A * | 4/1980 | Doherty | B23P 11/025 156/218 |
| 4,406,721 | A * | 9/1983 | Hoffmann | B29C 66/003 156/212 |
| 4,561,928 | A * | 12/1985 | Malthouse | B26D 1/385 156/497 |
| 4,738,082 | A * | 4/1988 | Saitoh | B65B 53/063 53/557 |
| 5,400,570 | A * | 3/1995 | Bennett | B65B 53/04 34/216 |
| 6,199,615 | B1 * | 3/2001 | Klarl | B08B 9/083 156/706 |

(Continued)

*Primary Examiner* — Mark A Osele
*Assistant Examiner* — Nickolas Harm
(74) *Attorney, Agent, or Firm* — Michael B. Einschlag

(57) ABSTRACT

One embodiment is a shrink labeler for use to shrink a shrink label onto a bottle including: a containment wall having a gas/steam inlet; and a showerhead container capable of holding the bottle in close proximity to orifices disposed therein and having an aperture through which the bottle may be introduced thereinto; wherein the gas/steam inlet is coupled to a plenum disposed between the containment wall and the showerhead container.

2 Claims, 4 Drawing Sheets

(56) References Cited

U.S. PATENT DOCUMENTS

| | | | |
|---|---|---|---|
| 7,028,452 B2* | 4/2006 | Liao | B65B 53/06 |
| | | | 53/442 |
| 7,811,084 B2* | 10/2010 | Huang | B29C 61/00 |
| | | | 432/121 |
| 8,235,712 B1 | 8/2012 | Lewis | |
| 8,596,325 B2* | 12/2013 | Bernhard | B65C 9/28 |
| | | | 156/497 |
| 8,828,170 B2* | 9/2014 | Stamatiou | B32B 27/10 |
| | | | 156/243 |
| 2005/0022469 A1* | 2/2005 | Fresnel | B65B 53/066 |
| | | | 53/399 |
| 2010/0032077 A1 | 2/2010 | Uetsuki et al. | |
| 2014/0014272 A1* | 1/2014 | Fresnel | B29C 61/00 |
| | | | 156/497 |
| 2015/0217891 A1* | 8/2015 | Whang | B65B 53/063 |
| | | | 53/442 |

* cited by examiner

COMPACT, LOW COST SHRINK LABELER

This patent application relates to U.S. Provisional Application No. 62/293,752 filed Feb. 10, 2016 from which priority is claimed under 35 USC § 119(e), and which provisional application is incorporated herein in its entirety.

TECHNICAL FIELD

One or more embodiments relate to a labeler. In particular, one or more embodiments relate to a compact, low cost shrink labeler.

BACKGROUND

Shrink labels are an effective way of decorating the contours of a plastic bottle with graphics and text without having to apply ink directly to the plastic bottle and without adhesives. Adhesiveless labels enable transferring graphics to a bottle containing cold liquid, since the cold liquid would normally have condensed water on the surface of the bottle, which condensed water would interfere with most adhesives. Shrink labels are often made with heat shrinkable polymers such as, but not limited to, heat shrinkable polyvinyl chloride (PVC) and polyethylene terephthalate glycol (PETG) polymer films. There are three main methods used to heat polymer films to shrink them: radiant heating, forced dry air convection, and steam heating. To utilize any of these three methods, labeling equipment is normally comprised of a heating tunnel with a conveyor belt running through it.

For radiant heating, a hot surface is created inside a heating tunnel and the resulting infrared radiation strikes the polymer films to heat and, thereby, shrink them. The hot surface can be created using heat lamps or resistance wires. For many shelf-stable drinks, a mild temperature increase is acceptable, and radiant heating can work inexpensively.

For forced dry air convection, hot air is created by passing air over a heating element or a combustion process could be used—with or without a heat exchanger. The heated air is then blown over the surfaces of the bottle and shrink film and, as a result, the film shrinks snuggly over the bottle. Since dry air does not have as much heat capacity as steam, the spatial uniformity of the shrink is subject to non-uniformities of the heat transfer coefficient due to varying scales of turbulence and temperatures of swirling hot air. As a result, depending upon the speed and shape of the bottle traveling on the conveyor belt relative to hot air in the tunnel, there can be regions of the label that get distorted and wrinkled, which distortions and wrinkles can be practically impossible to eliminate by changing the air temperature, convection speed, and/or the conveyor belt speed. A reason for these distortions and wrinkles is that the bottle is positioned standing up with its axis of rotation perpendicular to the direction of motion of the conveyor. As a result, the flow of hot air over the bottle is non-uniform, i.e., a leading side of the bottle will have a relatively predictable flow pattern, whereas a trailing, or downstream, side of the bottle will separate into vortices. In addition, air flow near a narrower neck of the bottle sheds vortices due to complex geometries of bottle narrowing. Such vortices tend to detach from the bottle in an alternating and irregular rhythm, and this leads to uncontrolled hot air velocity fields. Further, such uncontrolled hot air velocity fields lead to unreproducible heat transfer coefficients for hot air that is in contact with a shrink label and results in distortions or local overheating.

Steam labeling has the advantage that, due to the inherent ability of steam to transfer a heat at lower temperatures due to heat released during a phase change from gas to liquid on the label surface, steam can shrink a label with fewer wrinkles and can do it more uniformly than dry air convection. A problem with steam labeling is that, if the steam is too wet, droplets of water can condense on the shrink film. This may cause water beads to interfere with heat reaching the film locally while drier areas of the film get more concentrated heat and, thereby, shrink faster. This can lead to non-uniformity and/or more heat going into the liquid inside the bottle. To prevent too much condensation, the steam often needs to be produced in a pressurized boiler and released into the atmosphere to produce a drier steam. The problem of a higher pressure boiler is the potential for boiler explosion and the associated costs of equipment and facilitization to manage the safety risks. In addition, problems with current steam shrink labeling tunnels are that they are large, expensive, and use a lot of steam. They often require a large boiler that in some cities require a separate room to be constructed for safety purposes. The tunnels are often complex machines, having computer controls and many hundreds, if not thousands, of parts—all of which increases the cost of purchase and maintainability of the machine—and, as a result, rendering the machine non-portable.

SUMMARY

One or more embodiments address one or more of the above-identified problems. In accordance with one or more embodiments, a thermal environment is provided which controls a thermal boundary layer with less complexity and lower cost. To provide this thermal environment in accordance with one or more embodiments, a bottle is moved, along the bottle's vertical axis into a cavity (the cavity is defined by a showerhead container) into which steam is injected. Steam ports (i.e., orifices in the showerhead container) are placed in positions and angles so as to provide a predetermined amount of shrinkage using relatively little thermal energy expenditure to reduce energy costs associated with shrinking labels.

In particular, one embodiment is a shrink labeler for use to shrink a shrink label onto a bottle comprising: a containment wall having a gas/steam inlet; and a showerhead container capable of holding the bottle in close proximity to orifices disposed therein and having an aperture through which the bottle may be introduced thereinto; wherein the gas/steam inlet is coupled to a plenum disposed between the containment wall and the showerhead container.

DESCRIPTION

In order to shrink a label to fit a bottle with little distortion and few wrinkles or other defects, heat transfer to the label due to steam, as well as the temperature of the steam, to provide a predetermined amount of shrinkage of the label within a predetermined amount of time that the label is in contact with the steam. In accordance with one or more embodiments, steam is directed through a showerhead container disposed in close proximity to the bottle. As used herein, a showerhead container is a body comprised of orifices such as, for example and without limitation, holes, slots, and/or porous materials. An advantage of using a showerhead container in accordance with one or more embodiments over prior art steam tunnel designs is that the material and design costs of the labeler can be reduced substantially by delivering low pressure steam, i.e., less than about 15 PSIG, to a bottle and label where: (a) distances between the closest orifices of the showerhead container and the bottle, and thus, the label surface (i.e., gaps), may be in a range from about 0.01" to about 1.5"; and (b) the axis of symmetry of the bottle is aligned with the axis of symmetry of the showerhead container. Because the gap between the bottle and the showerhead container may be less than about 1.5", the characteristic size of turbulence is also less than 1.5". Because prior art steam and hot air tunnels have much larger open volumes, the characteristic size of their turbulence can be larger than 1.5", and this leads to larger non-uniformities for a given amount of steam or hot air. In addition, in order for a prior art steam or hot air tunnel to decrease the characteristic size of its turbulence, higher steam or hot air volume flow rates are required to increase mixing, and this, in turn, leads to higher steam or hot air consumption and energy costs to generate larger volumes of steam or hot air. As a result, for a given volume of steam or hot air, the rate at which heat is applied to a label using a showerhead container is more uniform than that achieved using prior art tunnel designs. Hence, when compared with prior art steam or hot air tunnel designs, use of one or more embodiments result in labels having less distortion and contained substances heating up less—all while consuming less steam or hot air, so that energy costs to create the steam or hot air are lower.

Figure 1:
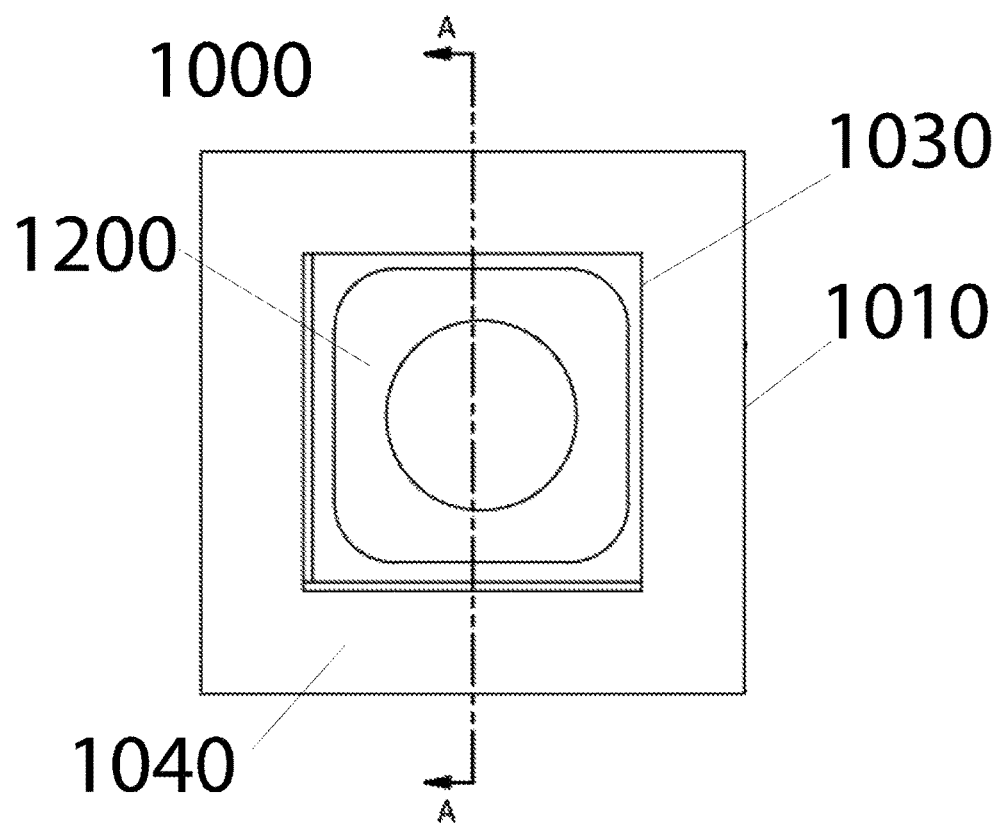
FIG. 1 shows a top view of a shrink labeler fabricated in accordance with one or more embodiments.
Figure 2:
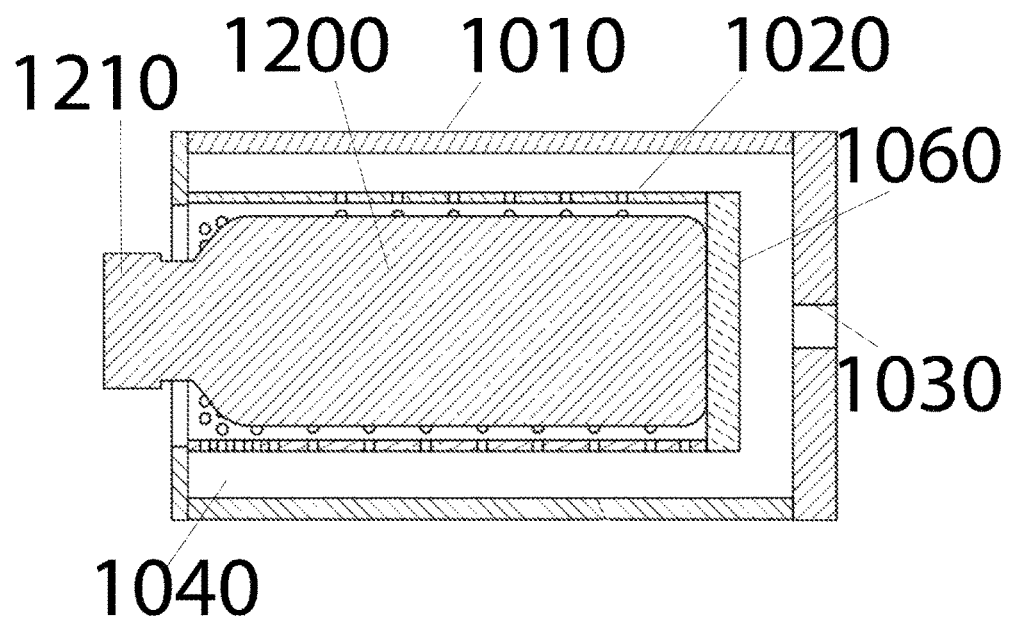
FIG. 2 shows a sectional view of the shrink labeler shown in FIG. 1.
Figure 3:
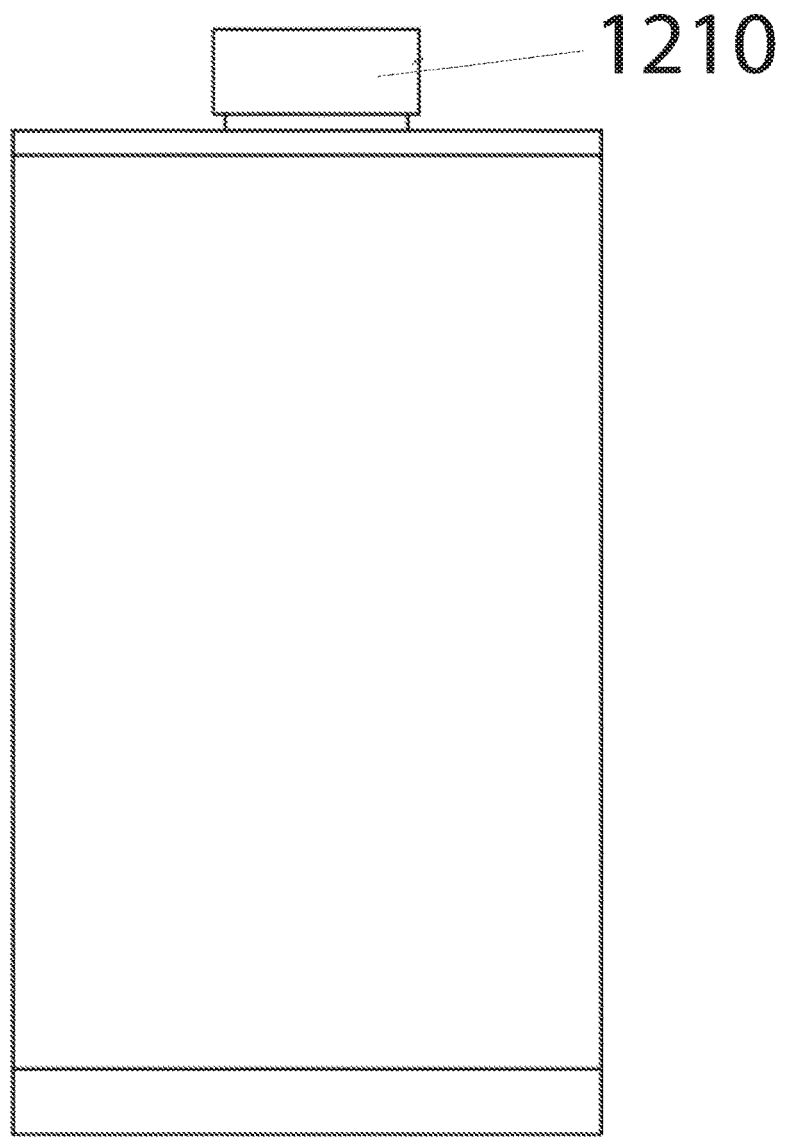
FIG. 3 shows a side view of the shrink labeler shown in FIG. 1.
Figure 4:
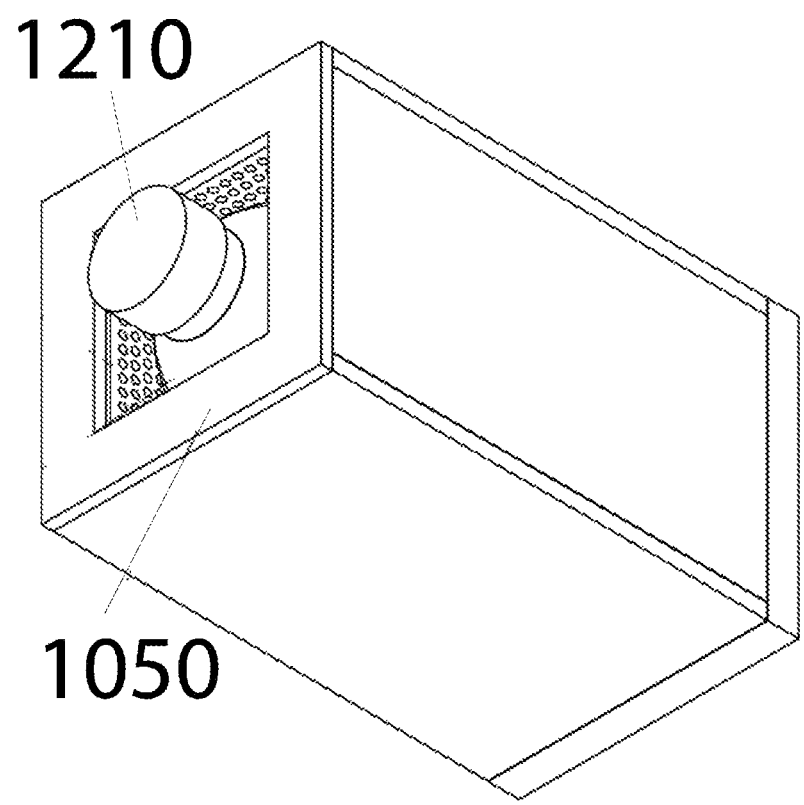
FIG. 4 shows a perspective view of the shrink labeler shown in FIG. 1.

FIG. 1 shows a top view of shrink labeler 1000 which is fabricated in accordance with one or more embodiments for use with bottle 1200 having straight sides. FIG. 2 shows a sectional view of shrink labeler 1000 with bottle 1200 inserted thereinto through the direction of arrows AA in FIG. 1; FIG. 3 shows a side view of shrink labeler 1000 with bottle 1200 inserted thereinto; and FIG. 4 shows a perspective view of shrink labeler 1000 with bottle 1200 inserted thereinto. As shown in FIGS. 1 and 2, shrink labeler includes containment wall 1010 which surrounds showerhead container 1020 and, as shown in FIG. 2, containment wall 1010 includes inlet port 1030. The inner diameter of port 1030 can be in a range from about 1/10" to about twice the width (or diameter) of bottle 1200. A preferred inner diameter is the size of a common pipe to carry the steam such as and inner diameter of about 3/4". The thickness of the wall through which port 1030 extends is in a range from being as thin as a thin polymer film, i.e., about 0.001", to being as thick as a solid of many tenths of inches in thickness. However, a preferred thickness range is from about 3/8" to about 1/2" so that port 1030 can accept a thread from a common plumbing fixture.

As further shown in FIGS. 1 and 2, plenum 1040 is formed in a space between showerhead container 1020 and containment wall 1010. The size of the gap formed by the plenum 1040, between containment wall 1010 and showerhead container 1020, depends upon the length of showerhead container 1020 along the direction of the axis of bottle 1200. In accordance with one or more embodiments, plenum 1040 is designed to reduce pressure losses between inlet port 1030 and showerhead orifices of showerhead container 1020 nearest bottle cap 1210 of bottle 1200. In accordance with one or more such embodiments, the size of the gap formed by plenum 1040 should be approximately a fiftieth, or greater, of the length of bottle 1200, with a preferred size of one twentieth, or greater, of the length of bottle 1200. Thus, for a six inch tall bottle, the gap size should be about 0.3" or larger. As further shown in FIGS. 2 and 4, shrink labeler 1000 includes plenum cover 1050 which keeps steam injected into plenum 1040 from escaping therefrom other than through the orifices in showerhead container 1020. As further shown in FIGS. 2 and 4, showerhead container 1020 includes sides having orifices therein to permit steam injected into plenum 1040 to pass therethrough. The geometric sizes, numbers, and spacings of the orifices that pass steam through showerhead container 1020 need to be suitable to enable the shrink label to shrink evenly, with minimal distortions. Due to the interaction of steam pressure fields inside plenum 1040 and adjacent to bottle 1200 as bottle 1200 is inserted into showerhead container 1020, the dimensions, numbers, and spacings of the orifices need to be determined experimentally and/or by computational fluid dynamics (CFD) techniques that are well known to those of ordinary skill in the art. One criterion of suitability of the orifices is determined by the amount of distortion a finished label has where less distortion is better. Another criterion of suitability of the orifices is temperature increase of contents of bottles (especially where substances inside bottle 1200 are frozen, perishable, and/or temperature sensitive). A straightforward method for fabricating a showerhead container using traditional machining tools is to drill circular holes through showerhead container 1020. However, using additive manufacturing techniques, such as, for example and without limitation, 3-D printing, orifices other than circular holes, such as but not limited to variable width slits, become readily constructed. The diameter and spacing of drilled holes in showerhead container 1020 will depend upon the pressure difference between inlet port 1030 and the pressure at the opening of showerhead container 1020 near bottle cap 1210 of bottle 1200. The larger the pressure difference, the smaller the inner diameter of the holes (or narrower slots) in showerhead container 1020 can be because larger pressure differences can push steam through smaller holes (or narrower slots). The hole sizes and/or slot widths in showerhead container 1020 should be as follows: an inner diameter in a range from about 1/64", preferably a hole having a 3/32" inner diameter through a wall having a 1/8" inch thickness in showerhead container 1020, which holes and/or slots are spaced so that the center-to-center distance of the holes is in a range from about 0.015" to about 2", preferably as little as 0.015" to 0.5". In practice, the sizes of, and center-to-center distances between, orifices can be determined experimentally by inserting a bottle into a showerhead container and seeing how much distortion of a label occurs, and checking the temperature increase of substances inside the bottle and/or by using computer software tools, such as computational fluid dynamics to look at the flow fields and temperatures at the surfaces of the label and bottle. If both the distortion and temperature increases of the substance inside the bottle are small enough, the design is satisfactory. If too much distortion occurs, orifices need to be added to locations toward which the label needs to be. This is because adding a hole to such a location will add more heat locally and the label will then shrink faster at the hole and pull the distortion towards the location of an additional hole. For a square sided bottle, preferred orifice locations are: (a) a single row on either side of the corners of the showerhead container, oriented along the axis of the bottle; (b) at least a single row of orifices, on all four sides of the showerhead container located at the top of the opening nearest the bottle cap 1210; and (c) at least a single row of orifices along the bottom closed end, on the vertical sides of showerhead container, closest to the bottom (for example bottom 1060 shown in FIG. 2). A preferred method for determining how many orifices are needed is to start with at least one opening through the showerhead container, test it and see how much temperature increase of the substance inside the bottle and distortion of the label occurs, and add more orifices as needed. The orifices through showerhead container do not have to have circular cross section, but can have cross sections of any shape such as, for example and without limitation, variable width slots, polygons, ovals, semicircles, and so forth. However, if the orifices are made by drilling, a circular hole is the standard shape. In addition, if the orifices are punched or made using 3D printing, non-circular shapes are practical. Also, for simplicity of manufacturing, the orifices are drilled perpendicular to the surfaces of showerhead container 1020. However, if needed, the orifices can be situated at an angle from perpendicular to direct the steam as needed to shrink the label with less distortion. As further shown in FIG. 2, showerhead container 1020 includes bottom 1060 upon which a bottle is disposed during a shrinking operation. Lastly, as shown in FIGS. 1-4, bottom 1060 is located so that when bottle 1200 is disposed in showerhead container 1020, bottle cap 1210 is disposed outside of showerhead container 1020.

In accordance with one or more embodiments, the various structures of labeler 1000, i.e., containment wall 1010, showerhead container 1020, plenum 1040, and plenum cover 1050 can be made of a combination of materials, such as, for example and without limitation, polymers, metals, semiconductors and/or ceramics. However, to reduce the cost of materials, an easy-to-form, lightweight, thermal tolerant polymer, such as, for example and without limitation, polycarbonate, can be used in place of more expensive and heavy stainless steel that is typically used in shrink tunnels.

As shown in FIGS. 1 and 4, the sides of showerhead container 1020 are straight, however, in accordance with one or more further embodiments, if the sides of bottle 1200 were round/curved, then the sides of showerhead container 1020 would also round/curved. In addition, in accordance with one or more further embodiments, the walls of containment wall 1010 can also be round.

In accordance with one or more embodiments, hot gas/steam is directed into plenum 1040 via inlet port 1030 shown in FIG. 2. Plenum 1040 enables the hot gas/steam to approach the orifices in showerhead container 1020 with little pressure drop. In particular, in accordance with one or more embodiments, the pressure at the orifices is in a range from about 1 PSIG to about 3 PSIG with about a ten percent (10%) or less pressure drop from inlet port 1030 to the opening at the top of showerhead container 1020 where bottle 1200 is inserted. For efficient use of steam and for a minimum amount of heat added to the contents of bottle 1200, the amount of steam administered to each region of the bottle should be correlated to amount that the label needs to be shrunk. For example, with a square sided bottle having a smaller neck near a bottle cap (like bottle 1200 shown in FIGS. 1-2 and 4, a majority of the steam needs to be directed at the region nearest bottle cap 1210 because the shrink label needs to shrink the most. Thus, the most steam needs to be directed through showerhead container 1020 at the top of showerhead container 1020 where the neck of bottle 1200 is located when the bottom of bottle 1200 hits bottom 1060 of showerhead container 1020. The amount of steam that the shrink label comes into contact with not only depends upon the number and sizes of the orifices in showerhead container 1020, but the amount of time that a region of the label stays in contact with the steam. As a result, in use in accordance with one or more embodiments, a bottle can be inserted into showerhead 1020 at a varying speed—slowing down where the label needs to shrink the most—and/or the steam injection rate can be controlled with the insertion speed to control the amount of steam that the label comes into contact with to control the amount of shrinkage the label undergoes. In addition, in accordance with one or more embodiments, the hot gas/steam can be directed to each or several grouped orifice(s) through a multitude of passages and/or adjustable/permanent flow restrictions to control the ratios and locations of hot gas flow to the surface of a shrink label. In general, experimentation is required to determine the number and locations of orifices in showerhead container 1020. In general, more orifices need to be placed where the label needs to be shrunk more. Thus, if a bottle has a single neck, more orifices needs to be placed adjacent the neck of the bottle when the bottom of the bottle touches the inner bottom of showerhead container. If there are multiple necks, then there would be multiple regions of orifices in the showerhead container corresponding to each "neck area" of the bottle. Examples of passages are, but not limited to: pipes; tubes; bonded, brazed or cast passage ways; that connect one or more inlet ports to orifices of a showerhead container. Plenum cover 1050 shown in FIGS. 1-4 has an opening which of sufficient size to allow a bottle to pass therethrough. In accordance with one or more embodiments, a seal is formed between plenum cover 1050 and containment wall 1010. Such a seal may be fabricating using manufacturing techniques such as, for example and without limitation, but not limited to mechanically pressing, bonding, welding plenum cover 1050 and containment wall 1010. In accordance with one or more embodiments, a complete seal between showerhead container 1020 and plenum cover 1050 does not have to exist. In fact, in accordance with one or more embodiments, gap(s) can exist between showerhead container 1020 and plenum cover 1050 to allow steam to be directed towards a narrower region of the bottle to help to direct hot gas to shrink the film faster than in wider regions of the bottle. The gap(s) would essentially form an air knife geometry. The smaller the total area of the gap facing the bottle, the faster the steam can be directed toward the bottle, but with a higher pressure drop. For a typical 4 fluid ounce to 64 fluid ounce sized bottle, gap(s) in the range from about 0.002" to about 0.2" wide, and preferably in a range from about 0.02" to about 0.08" wide can direct steam. In one or more embodiments a showerhead container has an opening just at the bottom or both at the top and bottom. For example, if the bottle is supported from below (with the bottle's opening on top), a showerhead container can be lowered from above the bottle as long as the bottom of the showerhead container 1020 has an opening on the bottom. On the other hand, if there is an opening at both the top and bottom of the showerhead container, the bottle can be lowered into the showerhead container 1020 and pass through the bottom of the showerhead container 1020. Showerhead container 1020 of shrink labeler 1000 holds a single bottle, however, in other embodiments, a showerhead container can hold (encircle) an array of bottles. For example, to process more than one bottle at a time, there might be more than one showerhead container in a row, or in a circle. In such an arrangement, several bottles could be moved on a conveyor or other transportation system next to the showerhead containers, and the bottles could then be placed into the showerhead containers.

In accordance with one or more embodiments, close proximity of orifices in the showerhead container to the bottle is defined as being in a range from about 0.01 to about 1.5 inches. On occasion a bottle can come into contact with the showerhead container, but it is better to have a gap in the range just mentioned so that the bottle can be moved in and out of the showerhead container easily. If a bottle cannot be kept centered reliably, for example if inserted by hand, then a smaller gap is better so that if one side of the bottle is in contact with the showerhead container then the opposite side is farthest from the showerhead container. If the absolute dimension between the contact and non-contacting side becomes too large, one side will shrink much faster than the other. Experimentation by allowing one side to contact the showerhead container and checking the amount of distortion of the label and temperature increase of the substance in the bottle will be used to determine whether the gap dimension is too large. In addition, in accordance with one or more embodiments, steam can be at a low, where low pressure is in a range from about 0.1 to about 3 PSIG with about a ten percent or less total pressure drop from inlet port 1030 to the orifices of the showerhead container. For these purposes, a relatively low pressure is, for example and without limitation, a few pounds per square inch above sea level pressure. Hence, such relatively low pressures are desirable for cost and safety issues since the use of relatively low pressure steam does not require placing a boiler behind safety structures nor does it require permitting and inspection if it's generated by commercial steamers that are used, for example, for removing wrinkles from clothing or bending wooden furniture components. A suitable low pressure commercial steamer can be obtained from a company offering such equipment use the following website http://www.earlex.ca/ss77ussg.php.

In accordance with one or more embodiments, the amount of hot gas and/or steam in contact with the bottle can be turned on, turned off, and/or throttled using a combination of sensor(s) that detect the presence of the bottle, and a circuit and/or a computer with memory to control the amount of hot gas/steam as a function of time. Some examples of sensors are, for example and without limitation, a capacitive sensor, a mechanical switch is actuated by the bottle, a mass flow controller, a flow switch, an optical light source (such as an LED, a bulb, and/or a laser) and a photosensor to determine whether a bottle is present and getting heated with the proper amount of hot gas/steam. If a person places a bottle into the showerhead container manually, control sensors and circuitry/computer with memory are not required.

In one example of use of shrink labeler 1000, a bottle with a PETG shrink label was placed inside showerhead container 1020. In this example, a 16 fluid ounce HDPE bottle filled with 40 degree F. yogurt with a PETG shrink label was shrunk without warpage, wrinkles, or other defects within 1-2.5 seconds after the bottom of the bottle broke the plane of the plenum 1040 of shrink labeler 1000. Steam power directed into shrink labeler 1000 was from two (2) 1500 watts commercial steamers (for a combined total of 3000 watts of steam).

In accordance with one or more embodiment, a shrink labeler is a vertical tube that allows the bottle to pass therethrough. A bottle can be manually directed through such a vertical tube style shrink labeler and/or can be transported by a mechanical device such as, for example and without limitation, a robot or similar mechanical linkage/actuator. In addition, as the bottle passes out of and below the shrink labeler, one or more streams of air can be used to blow off condensed water droplets to help dry the bottles. An example of how to create the stream of air for drying is to use an air-knife system from Exair (see web URL http://www/exair.com/en-US/Primary%20Navigation/Products/Air%20Knives/Pages/Air%20Knives%20Home.aspx) that uses a high speed jet of air, where the jet has a shape resembling a sheet of paper, and is fast enough to dry the surfaces of the label and bottle in less than 10 seconds.

Embodiments of the present invention described above are exemplary. As such, many changes and modifications may be made to the description set forth above by those of ordinary skill in the art while remaining within the scope of the invention. In addition, materials, methods, and mechanisms suitable for fabricating embodiments of the present invention have been described above by providing specific, non-limiting examples and/or by relying on the knowledge of one of ordinary skill in the art. Materials, methods, and mechanisms suitable for fabricating various embodiments or portions of various embodiments of the present invention described above have not been repeated, for sake of brevity, wherever it should be well understood by those of ordinary skill in the art that the various embodiments or portions of the various embodiments could be fabricated utilizing the same or similar previously described materials, methods or mechanisms. As such, the scope of the invention should be determined with reference to the appended claims along with their full scope of equivalents.

What is claimed is:

1. A shrink labeler that comprises:
   a container having a containment wall;
   a gas inlet disposed in the containment wall fluidly coupled to a plenum disposed in the container; and
   a showerhead container disposed within the container, which showerhead container includes a showerhead wall that surrounds a predetermined volume, and a showerhead aperture in the showerhead container that enables entry to the predetermined volume;
   wherein:
   the showerhead wall includes orifices that surround the predetermined volume and that fluidly couple gas from the plenum into the predetermined volume;
   the containment wall includes a wall aperture that enables entry to the predetermined volume through the showerhead aperture, and
   the showerhead wall comprises a first region and a second region, and wherein the orifices are more densely disposed in the first region than in the second region.

2. The shrink labeler of claim 1 further comprising a bottle, a portion of which is disposed in the predetermined volume, wherein the first region corresponds to a first portion of the bottle disposed in the predetermined volume and the second region corresponds to a second portion of the bottle disposed in the predetermined volume and a cross section of the first portion of the bottle has a smaller area that a cross section of the second portion of the bottle.

\* \* \* \* \*